United States Patent Office 3,146,162
Patented Aug. 25, 1964

3,146,162
GENTIAN VIOLET ADSORPTION COMPLEX
Harold A. Abramson, 133 E. 58th St., New York, N.Y.
No Drawing. Filed May 5, 1961, Ser. No. 107,919
7 Claims. (Cl. 167—55)

This invention relates to an adsorption complex of magnesium trisilicate and gentian violet which exihibits a number of unique characteristics making it highly useful for a variety of medical applications, some of which constitute known uses of gentian violet and others of which constitute new and different uses.

Gentian violet (methylrosaniline chloride) forms bactericidal solutions which stain the skin and clothing. It is one of the most widely used dyes in medicine. For application to the skin and mucous membranes a 1% solution is generally employed. For direct contact with tissues a 0.1% to 0.2% solution is often used. When used alone, gentian violet combines with necrotic tissue to form an eschar or scab. This property may be employed, for example, to treat the raw surfaces of burns and ulcers. Gentian violet has also been used in the treatment of intestinal infections like strongyloidiasis and oxyuriasis, but because of its irritant nature it has not heretofore been used in the therapy of gastric and duodenal ulcers where eschar formation with necrotic tissue might provide healing areas. Since gentian violet is not absorbed it is generally not toxic but on oral administration, nausea, vomiting, abdominal pain, and diarrhea have been listed as side effects. For this reason, gentian violet is usually prescribed in enteric coated tablets. Dosages for adults is about 60 milligrams three times daily, one hour before meals (De Re Medica, Eli Lilly & Co., 1951, pages 309–312). Slotkowski and Cwiak reported that ordinary gentian violet (i.e., National Formulary grade) applied to mucous membranes of the mouths of infants is not without danger (Medical Science, December 10, 1958, page 685).

It has long been obvious that it would be desirable to have gentian violet in a form which would not appreciably stain common materials used in clothing, and more importantly, would not stain normal skin, but would retain its characteristic ability to combine with injured or necrotic tissues to form an eschar. Obviously, it would also be advantageous and important to have a form of gentian violet which could be taken into the gastrointestinal tract without exhibiting the irritant qualities of ordinary gentian violet, thus obviating the necessity of using enteric coated tablets.

Briefly stated, the present invention resides in the unexpected discovery that the antacid, magnesium trisilicate, adsorbs, complexes, or combines with, gentian violet to form a product wherein the known disadvantages and untoward effects of ordinary gentian violet are substantially completely eliminated while exhibiting or potentially retaining its known desirable effects and uses, and also exhibiting a number of important new and unanticipated medical uses.

Magnesium trisilicate is itself known to have medical use as an antacid adsorbent for peptic ulcers, diarrhea, etc. The magnesium silicate appears to adsorb or complex with gentian violet in a unique way with the resulting product being stable, and therefore non-toxic, in ordinary body liquids and with respect to normal tissues, but retaining the full eschar potential of ordinary gentian violet so that in effect, the new product is selectively reactive only with injured or necrotic tissue but is without effect or action on normal or uninjured tissues or membranes. Furthermore, it has been discovered that there are practical ways in which the magnesium silicate-gentian violet complex can be used so that it acts as a depot for slow release of additional amounts of gentian violet in solution over prolonged periods. Upon release into solution the gentian violet regains or exhibits its original biological and chemical qualities.

The object of my invention, generally stated, is the provision of gentian violet in a new form in which its undesirable properties and untoward effects have been eliminated or substantially suppressed, whereby the new product is better suited for certain of its known uses, may be used for several new purposes for which it was previously unsuitable, and for still others not previously considered.

A further object of the invention is the provision of gentian violet in a form which selectively reacts only with injured or necrotic skin or membrane but which does not stain or react with normal or uninjured tissues, skin or membranes.

A further object of the invention is the provision of a new and improved form of gentian violet which in addition to reacting selectively with only normal or undamaged tissues, skin or membrane, also deposits or leaves at the reacted areas depots of the gentian violet essentially in contact with, and providing prolonged protection to, the injured tissue, skin or membrane.

A further object of the invention is the provision of a magnesium trisilicate-gentian violet complex or adsorption complex consisting of gentian violet and magnesium trisilicate as an adsorbing carrier, which product exhibits or potentially retains the medical effectiveness and properties of both magnesium trisilicate and the gentian violet, while exhibiting a number of new and different properties, and being devoid of the objectionable properties or untoward effects of ordinary gentian violet.

A further important object of the invention is the provision of a new and improved form of gentian violet, i.e., magnesium trisilicate-gentian violet adsorption complex, for medical applications in the gastrointestinal tract wherein it will exhibit the following desirable characteristics and properties: the gentian violet will not be substantially eluted either by the hydrochloric acid of the stomach, large volumes of water, or the alkalinity in the intestines; the gentian violet complex remains in depot form in the stomach and intestines wherein it is non-irritating; it is relatively non-toxic compared with ordinary gentian violet so that the complex may be taken by mouth in therapeutic quantities; and, the magnesium silicate portion of the complex exhibits its usual antacid adsorptive properties.

An important object of the invention is the provision of gentian violet adsorbed by an antacid, i.e., magnesium trisilicate, which is suitable for the treatment of human hyperacidity and gastral intestinal ulcers, with the gentian violet being capable of reacting with injured tissues and remaining at the sites of the reacted areas so as to create depots for providing prolonged supplies of the gentian violet for the affected areas.

A further important object of the invention is the provision of a gentian violet product which will selectively stain or react only with injured or necrotic tissues, skin or membrane, and which will remain in depot quantities slowing releasing small amounts of the gentian violet into the injured tissue, skin or membrane without irritation thereto, and without release or creation of any poisonous substances into the injured areas, even though they may be large.

Another important object of the invention is the provision of gentian violet in a form which, although releasing gentian violet very slowly in aqueous media, will release it more rapidly when the dielectric constant of the media is lowered, such as the lower dielectric constant found in cell membranes of the body.

Another important object of the invention is the provision of a new and improved form of gentian violet in which it is combined or complexed with an antacid, which complex will immediately provide a coating of the antacid compound over minute lesions in the stomach and intestines thus forming a semi-permanent antacid shield protecting the injured tissues from the fluids of the gastrointestinal tract, and also preventing the spread of the lesions by the damaging effect of such fluids and stomach acids on tiny areas of injured tissue.

Still another object of the invention is the provision of a stable gentian violet preparation which will not release the gentian violet into aqueous systems except under controlled conditions, as for example in the presence of therapeutic quantities of a detergent or wetting agent such as sodium lauryl sulphate.

Certain other objects of the invention will, in part, be obvious and will in part appear hereinafter.

For a more complete understanding of the nature and scope of the invention, reference may now be had to the following detailed description thereof and the appended claims.

To date, magnesium trisilicate (or simply magnesium silicate as it is also designated) has been found to be outstanding and unique in its ability to adsorb and properly combine or complex with gentian violet so as to yield novel products which are useful in accordance with the present invention. At the present time, it appears that a preferred useful range of proportions is from 0.1% to about 4% by weight of gentian violet adsorbed by the antacid. However, there may be applications in which even amounts under 0.1% gentian violet may be adsorbed, and others in which amounts larger than 4% are adsorbed. While the exact nature of the adsorption complex has not been completely established in all respects, it can be readily established that it is more than simply a mere mechanical mixture of the two materials. All indications point to the fact that the gentian violet forms an adsorption complex with the magnesium trisilicate from which the gentian violet may be released under certain conditions and in which it is fully reactive, exhibiting its normal affinity for injured or necrotic tissue, skin or membrane. On the other hand, the degree of bonding or holding action of the adsorptive antacid on the gentian violet is such that it does not exhibit the usual staining action on normal or uninjured, skin, membrane or tissues, or the ordinary materials from which articles of clothing are formed.

The magnesium trisilicate-gentian violet adsorption complex may be readily prepared in an aqueous medium simply by mixing fine particle grade of free-flowing magnesium trisilicate powder with an aqueous solution of the gentian violet, followed by filtering. The magnesium trisilicate-gentian violet complex forms immediately, apparently, by adsorption on the silicate, and on filtering is retained on the filter media. It may be air dried in the open or in an oven, to give a fine purple powder having essentially the same texture as the original magnesium trisilicate powder. If desired, instead of filtering the resultant slurry, the water may be evaporated leaving behind a dried residue of the adsorption complex. The following example will serve to illustrate a specific manner in which the new complex may be prepared.

*Example 1*

Four grams of gentian violet (methylrosaniline chloride, N.F.) is dissolved in 2000 ml. of water at room temperature. 100 grams of magnesium trisilicate powder (e.g., precipitated hydrated magnesium silicate, U.S.P. grade) is added directly to the gentian violet solution and stirred. The resulting mixture is then filtered after a short period of time on laboratory filter paper with the filter paper being removed from the funnel and dried in an oven at 60° C. A fine purple powder residue is left which can be readily removed from the filter paper. Since there is practically no gentian violet left in solution, the 4 grams of gentian violet has been adsorbed by the magnesium trisilicate powder.

It will be apparent from the simplicity of the foregoing example that the new product also may be readily prepared in larger quantities by employment of suitable pieces of known equipment such as slurry tanks, mechanical filters, drying ovens, evaporators, etc.

The magnesium trisilicate-gentian violet complex prepared in accordance with the foregoing example may be repeatedly washed with large volumes of water over a period of months without any appreciable elution of the gentian violet. In a similar fashion, neither 0.1 normal hydrochloric acid, 1% sodium bicarbonate, 0.01 normal sodium hydroxide, nor 0.1% solution of bile salts, will elute the gentian violet from the complex even though it is exposed to these liquids for many days. However, the addition of alcohol (e.g., grain alcohol) to an aqueous suspension of the magnesium trisilicate-gentian violet complex immediately releases some of the gentian violet in dissolved form in the solution. Other alcoholic-like solvents such as acetone have a similar effect on the adsorption complex, releasing gentian violet therefrom. The dissolved gentian violet released from the complex by ethyl alcohol or other similar non-aqueous solvents, exhibits all the properties of ordinary gentian violet and stains normal skin and clothing in the usual way.

Magnesium trisilicate appears to have unique properties among various adsorbents for adsorbing or complexing with gentian violet in that it readily yields a product which exhibits essentially complete irreversibility and stability in the presence of water, dilute aqueous acids and bases, and acidic and alkaline salt solutions. Other antacids such as bismuth subgallate, bismuth subcarbonate, aluminum hydroxide, aluminum hydroxide-magnesium carbonate co-precipitate, and magnesium oxide, do not behave the same way with gentian violet that magnesium trisilicate does since the dye can be readily washed from these other antacids. For example, 0.1% solutions of gentian violet in quantities ranging from 0.2 to 1 ml. were mixed with 1 gram samples of each of the foregoing materials as well as magnesium trisilicate. In each case the various samples of colored precipitate were then centrifuged but only in the case of magnesium trisilicate were the supernatant solutions colorless. Apparently, with respect to the other adsorbents unstable, reversible and different complexing took place as distinguished from that obtained when magnesium trisilicate and gentian violet are brought together in an aqueous media.

While the magnesium trisilicate-gentian violet complex does not give up the adsorbed gentian violet on repeated washing with a number of detergents, it is released in the presence of sodium lauryl sulphate. This behavior can be made use of medically in various ways. For example, sodium lauryl sulphate has known use in certain mixtures for treatment of the vaginal tract. Since a 0.2% sodium lauryl sulphate will elute some gentian violet, even in aqueous systems, this phenomenon can be put to medical use. An experiment was performed in which there was a quantity of magnesium trisilicate-gentian violet complex in the presence of a 0.2% aqueous solution of sodium lauryl sulphate. Quantities of magnesium trisilicate were used to remove or adsorb some of the dissolved gentian violet from the supernatant solution. However, additional quantities of the gentian violet were then released from the magnesium trisilicate-gentian violet complex upon re-treatment with the original sodium lauryl sulphate solution from which the dissolved quantity of gentian violet had been removed. This process may be repeated several times without noticeable depletion of the gentian violet from the depot provided by the magnesium trisilicate-gentian violet complex. From the foregoing simple experiment it is clear that the presence of sodium lauryl sulphate acts as a carrier for slowly eluting gentian violet from the complex in a way to provide a system consisting of a depot of the adsorbed gentian violet and a steady flow of dissolved gentian violet from the depot to combine with a reactive agent such as bacteria, viruses and animal parasites.

It was pointed out above that gentian violet is not eluted from its complex with the magnesium silicate on repeated washing with hydrochloric acid of the strength encountered in the stomach fluid. However, if the magnesium trisilicate-gentian violet complex is to serve as an antacid in the gastro-intestinal tract, the adsorbed gentian violet must not appreciably interfere with the acid binding power of the magnesium trisilicate as it might be expected to, due to the highly polar nature of the gentian violet. In order to determine whether or not the antacid properties of the magnesium silicate are lost or substantially interfered with upon complexing with the gentian violet, the complex was compared on titration with acid with a control consisting of magnesium trisilicate alone. Samples of the complex and of the magnesium trisilicate containing 4% gentian violet alone were thus titrated with the glass electrode to determine their respective acid combining properties or capacity and it was surprising to find that there was no detectable change in the ability of the complexed magnesium trisilicate to combine with acid. In other words, the titration curves of the untreated magnesium trisilicate and of the magnesium trisilicate-gentian violet complex were essentially the same. In making the comparison, 10 ml. of 0.1 normal hydrochloric acid was added to 1 gram of the magnesium trisilicate-gentian violet complex in a total volume of 110 ml. The pH of the mixture was measured after 2 minutes by the glass electrode and found to be 4.9. After 5 minutes the pH was 5.7. Then another 10 ml. of 0.1 normal hydrochloric acid was added and the pH measured after 5 minutes and found to be 2.65. The control run using pure magnesium trisilicate gave pH values closely paralleling those obtained with the gentian violet complex. Thus, the pH 2 minutes after addition of 10 ml, of 0.1 normal HCl was 5.2; after 5 minutes it was 5.8. After addition of the second 10 ml. of 0.1 hydrochloric acid the pH was 2.65 after 5 minutes.

A typical experiment for depicting the way in which the magnesium trisilicate-gentian violet complex selectively reacts with injured skin, but does not stain or react with normal skin may be carried out as follows: a mechanical scratcher of known type is used for cutting rings the shape of a doughnut on the skin, each wound being uniform because it is dependent upon the spring action of the mechanical scratcher and independent of the operator. The skin is cut deeply enough so that blood oozes out from the circular cuts but it does not flow freely. It is best to have five to ten of these circular cuts in each lesion area to be studied. Two adjacent lesion areas on the anterior surface of the forearm, each containing the same number of circular cuts, were treated in two different ways. In one of the areas, the gentian violet-magnesium trisilicate complex as a powder, aqueous suspension, or suspension in glycerin or other vehicle, is rubbed into the wounded area. In this case the complex reacts essentially only with the injured areas of the skin forming a film or eschar over the wounds. The wound is violet in color and is formed of the gentian violet-magnesium trisilicate bonded to the injured tissues by the gentian violet. However, the gentian violet complex may be readily washed off the contiguous normal or uninjured areas of this lesion.

The companion or second lesion area is treated with a 1% aqueous solution of gentian violet only, and then this area is washed. The free gentian violet not only reacts with the injured cuts but also with the normal skin so that the normal skin in and outside the circular cuts is deeply stained with the gentian violet. The practice has been to compare a gentian violet-magnesium trisilicate complex containing 4% gentian violet with the 1% aqueous solution of ordinary gentian violet. By thus creating the two injured lesion areas, one stained with the magnesium trisilicate-gentian violet complex, and the other stained only with gentian violet itself, a comparison of the life of the complex in the cuts may be made with the life period of the dissolved gentian violet itself in the cuts. Typically, the lesion stained with ordinary gentian violet remains stained for about 4 days during which time it is washed daily with soap and water. However, such daily washing did not completely remove all of the gentian violet from either lesion area even after 9 days of treatment. Thus, the gentian violet-magnesium trisilicate complex stained wounded areas of the skin approximately the same way as does ordinary gentian violet itself. However, the complex stained only the wounded areas whereas the solution of ordinary gentian violet stained the uninjured areas as well.

After 12 days, both sets of wounds had healed over almost completely with only traces of gentian violet staining left. Experiments of this type show that the reaction of the magnesium trisilicate-gentian violet complex with the injured tissue is obtained primarily by the combining groups of the gentian violet and not by the groups of the magnesium silicate.

The magnesium trisilicate-gentian violet complex reacts not only with the injured skin tissue, but also with the injured tissue in the stomach and upper intestinal tract. For example, a rabbit was sacrificed with chloroform and the stomach excised and washed. With a sharp scalpel, the mucous membrane of the stomach was repeatedly cut so that it was damaged in many directions. The stained areas showed that the magnesium trisilicate-gentian violet complex reacts with the injured tissues of the stomach leaving the normal pink areas of the uninjured mucous unstained by the complex after vigorous washing of the stomach with tap water. A preparation of this type may be preserved in 50% glycerin and toluene for several days, with the gentian violet-magnesium trisilicate complex still staining only the injured tissues of the stomach. Similar experiments were performed with injured areas of the small intestine of the rabbit with the result that the magnesium trisilicate-gentian violet complex again selectively stained only the injured tissue.

The magnesium trisilicate-gentian violet complex has been used successfully in the treatment of minor burns and cuts of the skin, and in allergic eczema of the skin. In such treatments, the complex may be applied directly as a powder with the excess powder being readily washed from the areas of eczema or uninjured areas of the skin since the gentian violet complex reacts only with the injured tissues. The complex may also be applied as a suspension in ointment form using as simple a vehicle as a glycerin base because of the special properties of the magnesium trisilicate compound. When the magnesium trisilicate-gentian violet complex is applied in this way it protects the injured areas and also provides a means of following the reparative processes of the skin since, as the injured skin heals, the gentian violet-magnesium trisilicate complex no longer reacts with the skin. In some instances the gentian violet complex seems to expedite the healing of the eczematous areas.

Three grams of 4% gentian violet-magnesium trisilicate compound may be taken either as a powder, a suspension, or in capsule or pill form, four times daily, by ulcer patients with no irritation due to the gentian violet complex, but with effective neutralization of hyperacidity by the magnesium trisilicate. For prolonged therapy over several months, mixtures of magnesium trisilicate itself with the purple magnesium trisilicate-gentian violet complex may be used. Or, the magnesium trisilicate may be treated with lower concentrations of gentian violet so that it is present therein at a level as low as 0.1%. Experiments on injured areas of the skin disclose however, that even as such a low level as 0.1% the gentian violet in magnesium trisilicate complex will still stain injured areas of the skin with the characteristic purple stain.

Accordingly, it appears that all that is necessary to have the magnesium trisilicate act as a carrier for the gentian violet, is to have a comparatively few molecules of the gentian violet adsorbed on the surface of the magnesium trisilicate with the polar groups of the gentian violet still sufficiently exposed to react with inter-tissues very much the same way that unadsorbed gentian violet does.

The magnesium trisilicate-gentian violet adsorption complex is also useful in veterinary medicine, especially in ointment form.

Having fully described my invention and mentioned a number of uses of the product and given a practical method of preparation, what is claimed as new is:

1. Magnesium trisilicate-gentian violet adsorption complex.
2. Magnesium trisilicate-gentian violet adsorption complex containing a major proportion of magnesium trisilicate and a minor proportion of gentian violet.
3. Magnesium trisilicate-gentian violet adsorption complex containing at least about 0.1% by weight of gentian violet.
4. Magnesium trisilicate-gentian violet adsorption complex containing from about 0.1% to 4% by weight of gentian violet.
5. A medicament consisting essentially of magnesium trisilicate-gentian violet adsorption complex in an inert carrier.
6. A preparation comprising an aqueous solution of gentian violet and a small percent of an eluting agent and a quantity of undissolved magnesium trisilicate-gentian violet complex.
7. A preparation comprising an aqueous solution of gentian violet and a small percent of sodium lauryl sulphate and a quantity of undissolved magnesium trisilicate-gentian violet complex.

References Cited in the file of this patent
UNITED STATES PATENTS
173,607    Fehr ------------------ June 23, 1875

OTHER REFERENCES

Merck Index, 6th Edition, 1952, pages 634 and 642.
Chemical Abstracts, vol. 25, entry 1286$^9$, 1931 (citing Spangnol, Arch. Sci. Biol. (Italy), 15, 216–48, 1930).
Chemical Abstracts, vol. 40, entry 4478$^4$, 1946 (citing Mukherjee et al., Quart J. Pharm. Pharmacol. 19, 14–21, 1946).
Chemical Abstracts, vol. 48, entry 7388c, 1954 (citing Carroll et al., J. Phys. Chem., 58, 335–8, 1954).